US00RE37949E

(19) United States
(12) Reissued Patent
Emery et al.

(10) Patent Number: US RE37,949 E
(45) Date of Reissued Patent: Dec. 31, 2002

(54) PRODUCTION OF ANIONIC SURFACTANT GRANULES BY IN SITU NEUTRALIZATION

(75) Inventors: William Derek Emery, Wirral (GB); Kenneth Metcalfe, Wirral (GB); Peter James Tollington, Rotterdam (NL)

(73) Assignee: Lever Brothers Company, division of Conopco, Inc., New York, NY (US)

( * ) Notice: This patent is subject to a terminal disclaimer.

(21) Appl. No.: 09/338,256

(22) Filed: Jun. 22, 1999

Related U.S. Patent Documents

Reissue of:
(64) Patent No.: 5,641,741
Issued: Jun. 24, 1997
Appl. No.: 08/518,931
Filed: Aug. 24, 1995

(30) Foreign Application Priority Data

Aug. 26, 1994 (GB) ..... 9417354

(51) Int. Cl.[7] ..... C11D 17/00
(52) U.S. Cl. ..... 510/446; 510/444; 510/457; 510/536
(58) Field of Search ..... 510/457, 336, 510/404, 444, 536, 446, 426

(56) References Cited

U.S. PATENT DOCUMENTS

| | | | | |
|---|---|---|---|---|
| 4,664,839 | A | 5/1987 | Rieck | 252/175 |
| 4,820,439 | A | 4/1989 | Rieck | 252/135 |
| 5,052,122 | A | 10/1991 | Ishikawa et al. | 34/5 |
| 5,409,627 | A | 4/1995 | Boskamp et al. | 252/102 |
| 5,427,717 | A | 6/1995 | Schisla et al. | 252/549 |
| 5,431,857 | A | 7/1995 | Capeci | 252/549 |
| 5,451,336 | A | 9/1995 | Schwadtke et al. | 252/89.1 |
| 5,451,354 | A | 9/1995 | Aouad et al. | 264/117 |
| 5,490,954 | A | 2/1996 | Van der Hoeven et al. | 252/550 |
| 5,646,107 | A | 7/1997 | Emery et al. | 510/457 |

FOREIGN PATENT DOCUMENTS

| | | |
|---|---|---|
| EP | 384 070 | 8/1989 |
| EP | 340 013 | 11/1989 |
| EP | 345 090 | 12/1989 |
| EP | 367 339 | 5/1990 |
| EP | 384 480 | 8/1990 |
| EP | 0402317 | * 9/1990 |
| EP | 390 251 | 10/1990 |
| EP | 390 287 | 10/1990 |
| EP | 402 112 | 12/1990 |
| EP | 420 317 | 4/1991 |
| EP | 458 397 | 11/1991 |
| EP | 458 398 | 11/1991 |
| EP | 506 184 | 9/1992 |
| EP | 508 543 | 10/1992 |
| EP | 509 787 | 10/1992 |
| EP | 555 622 | 8/1993 |
| EP | 572 957 | 12/1993 |
| EP | 645 445 | 3/1995 |
| GB | 1188582 | 4/1970 |
| GB | 1404317 | 8/1975 |
| GB | 1 437 950 | 6/1976 |
| GB | 1 470 250 | 4/1977 |
| GB | 1 473 201 | 5/1977 |
| GB | 1 473 202 | 5/1977 |
| WO | 93/19155 | 9/1993 |
| WO | 94/18303 | 8/1994 |
| WO | 98/38278 | 9/1998 |
| WO | 98/40461 | 9/1998 |

OTHER PUBLICATIONS

Opposition filed by VRV S.p.A., Italy in European patent 95 93 1175.4 Aug. 3, 1999.
VRV S.p.A. Industrial Plants and Processes Manufacturing Brochure *NMA.
Lange, "Detergents and Cleaners, A Handbook for Formulators", Hanser Publishers, Munich, Vienna and New York, pp. 14–17, (1994) *NMA.
International Search Report in International Patent Application No. 95/03320.
Derwent Abstract of WO 94/18303.

* cited by examiner

*Primary Examiner*—Necholus Ogden
(74) *Attorney, Agent, or Firm*—Rimma Mitelman

(57) ABSTRACT

A process for producing granules of anionic surfactant, preferably PAS by in situ neutralisation of a precursor acid to form the surfactant, heating the surfactant to a temperature in excess of 130° C. and subsequently cooling the to provide surfactant granules is disclosed. Detergent compositions containing such granules are also disclosed.

4 Claims, No Drawings

PRODUCTION OF ANIONIC SURFACTANT GRANULES BY IN SITU NEUTRALIZATION

Matter enclosed in heavy brackets [ ] appears in the original patent but forms no part of this reissue specification; matter printed in italics indicates the additions made by reissue.

The present invention relates to detergent particles, a process for their production and a composition containing them. More particularly the present invention relates to a process for the production of detergent particles having a high level of anionic surfactant which involves in situ neutralisation of an acid precursor of the anionic surfactant and drying of the surfactant thereby produced and to the particles thereby obtained.

Detergent-active compounds conventionally employed in detergent compositions include anionic surfactants e.g. linear alkylbenzene sulphonates (LAS), linear alkyl ether sulphate (LES) and primary alkyl sulphates (PAS), and nonionic surfactants e.g. alcohol ethoxylates. To improve detergency performance it is desirable to provide a high level of detergent-active material in the powder.

Often, the maximum level of active that may be incorporated is limited by process requirements. Detergent compositions having a high bulk density are typically prepared by a process involving mixing or granulation of components of the composition and/or a base powder obtained for example from a spray-drying process and provide significant consumer benefits as compared to compositions of lower bulk density. It is known to incorporate detergent active compounds into such compositions in liquid form. However as it is necessary to control the ratios of liquids to solids in order to form detergent granules the maximum level of detergent active material which may be incorporated in this manner is limited. It is also known to incorporate anionic surfactant e.g. PAS in detergent compositions by means of a solid adjunct, that is, a particle comprising the surfactant and other components of the composition e.g. sodium carbonate and builder. Hitherto, the level of anionic surfactant present in such adjuncts has been limited due to the need to provide good flow properties and reduce the tendency to agglomerate. It is also known to incorporate anionic surfactants by the in-situ neutralisation of an acid precursor of the surfactant.

EP-A-506 184 (Unilever) discloses a process for the continuous dry neutralisation of liquid acid precursor of anionic surfactant. Detergent particles having an active detergent content of 30 to 40% by weight may be prepared by this process.

EP 572 957 discloses a process for producing a powdery anionic surfactant by feeding an aqueous slurry of the surfactant containing 60 to 80% solids into an evaporator, forming a film of the surfactant on the reactor wall and scraping it from the wall whilst drying and concentrating the slurry. The production of particles comprising anionic surfactant by in-situ neutralisation is not disclosed.

However, sufficient water must be present in the slurry to ensure that the slurry be pumpable. A large proportion of this water is necessarily removed in producing the powdery surfactant which requires energy and increases residence time. Thus, the energy required in the process and the throughput of the process are adversely effected where the slurry has a high water content. Moreover, a powder having a high water content may interact unfavourably with water sensitive components in fully formulated detergent compositions, e.g. bleach, thus providing poor stability and storage difficulties.

We have found that by feeding a liquid acid precursor of a anionic surfactant and neutralising agent to a drying zone and forming the anionic surfactant in-situ in the drying zone the above disadvantages may be ameliorated.

Accordingly a first aspect of the invention provides a process for the production of detergent particles comprising at least 50% and preferably 65% by weight of an anionic surfactant and not more than 20% and preferably not more than 15% by weight of water which comprises contacting a pumpable precursor acid of an anionic surfactant with a pumpable aqueous neutralising agent in a drying zone to produce an anionic surfactant the total water content being in excess of 10% by weight and preferably in excess of 20% by weight, heating the surfactant to a temperature in excess of 130° C. and preferably in excess of 140° C. in the said drying zone to reduce the water content to not more than 20% and preferably not more than 15% by weight, and subsequently cooling the surfactant to form detergent particles.

The heat of neutralisation evolved in the drying zone reduces the requirement for external heating of the drying zone and is advantageous over processes in which surfactant paste is employed as a feedstock.

Moreover, it is a particular advantage of the present invention that the precursor acid may be fed to the drying zone in liquid form rather than as an aqueous solution and the neutralising agent may be concentrated. The total amount of water introduced into the drying zone may be reduced significantly as compared to processes in which a surfactant paste is employed. Such pastes may require at least 30% by weight of water in order to be pumpable.

The present process may be operated as a single step process (ie. the detergent particles are obtained directly from a precursor acid feedstock) rather than as a two step process involving production of the surfactant and subsequent formation and drying of a paste to form the detergent particles. This is advantageous as the need to produce a surfactant paste, which can present technical difficulties, is avoided as is the need for transport and storage of the paste.

The precursor acid for example PAS acid, is suitably fed to the drying zone in the liquid phase. As the precursor acid may be thermally unstable, the neutralisation preferably occurs sufficiently rapidly and substantially completely such that thermal decomposition of the acid due to the elevated temperature is minimised and desirably avoided.

The precursor acid is suitably fed into the drying zone at a temperature of 40° to 60° C. to ensure it is in the liquid form but without encouraging thermal decomposition. The neutralising agent may be fed into the drying zone at any desired temperature but 50° to 70° C. is preferred to facilitate neutralisation rather than acid decomposition.

In order to effect removal of water, the walls of the drying zone are suitably at a temperature of at least 100° C., preferably at least 130° C. and especially at least 140° C.

Suitably the neutralising agent is introduced as an aqueous solution or slurry. Conventional neutralising agents may be employed including alkali metal hydroxides for example sodium hydroxide and alkali metal carbonates, for example sodium carbonate.

Suitably the neutralising agent is present in an amount of 25 to 55% and preferably a 30 to 50% by weight of the aqueous solution or slurry. A high concentration of the neutralising agent may give unwanted crystallisation and a low concentration is undesirable due to the large proportion of water.

The concentration of the neutralising agent solution or slurry may be varied in order to control the water content in the drying zone. Thus, optimum viscosity characteristics may be attained whereby the material in the drying zone remains transportable/pumpable.

A stoichiometric excess of neutralising agent with respect to the acid precursor may be employed. The excess neutralising agent combines the acid, for example sulphuric acid which may be produced if part of the precursor acid thermally decomposes.

Desirably the drying zone is under a slight vacuum to facilitate the removal of water and volatiles. The vacuum may be from 100 Torr up to atmospheric pressure as this provides significant process flexibility. However, a vacuum in excess of 500 Torr up to atmospheric has the advantage of reducing capital investment whilst providing vacuum operation.

We have found that improved control of residence time and particle size may be secured, disadvantageous thermal decomposition of the acid may be reduced or avoided and process throughput may be increased by agitating the material in the drying and/or cooling zone.

Accordingly a second aspect of the invention provides a process for the production of detergent particles comprising at least 50% and preferably 65% by weight of an anionic surfactant and not more than 20% and preferably not more than 15% by weight of water which comprises contacting a pumpable precursor acid of an anionic surfactant with a pumpable neutralising agent in a drying zone to produce an anionic surfactant, the total water content being in excess of 10% and preferably in excess of 20% by weight, agitating the precursor and neutralising agent with agitation means which have a tip speed in excess of 15 $ms^{-1}$ and preferably in excess of 20 $ms^{-1}$ heating the surfactant to a temperature in excess of 130° C. and preferably in excess of 140° C. in the said drying zone to reduce the water content to not more than 20% by weight and preferably not more than 15% by weight and subsequently cooling the surfactant to form detergent particles.

Advantageously the present invention provides for rapid throughput as compared to a process in which a paste containing a pre-neutralised surfactant is employed.

The process is preferably continuous as this facilitates continuous transportation of the particles. In a continuous process the flow rate is suitably of the order of 10 to 25 $kg/m^2/hr$ and preferably 17 to 22 $kg/m^2/hr$ e.g. 20 $kg/m^2/hr$.

Suitably the average residence time in the drying zone is less than 5 minutes. A residence time of less than 4 minutes is especially preferred with as low a residence time as possible being most preferred.

Agitation of the precursor and neutralising agent (hereinafter referred to as the feedstocks) in the heating zone generally provides efficient heat transfer and facilitate removal of water. Agitation reduces the contact time between the feedstocks and the wall of the drying zone which, together with efficient heat transfer, reduces the likelihood of 'hot spots' forming which may lead to thermal decomposition. Moreover, improved drying is secured thus allowing a shorter residence time/increased throughput in the drying zone.

To avoid thermal decomposition, the temperature of the drying zone preferably does not exceed 170° C.

The process of the present invention permits the formation of particles having a high bulk density for example in excess of 550 $g/cm^3$.

The material is cooled in a cooling zone which is suitably operated at a temperature not in excess of 50° C. and preferably not in excess of 40° C. e.g. 30° C. Desirably there is agitation within the cooling zone to provide efficient cooling of the material therein. By actively cooling the particles, the possibility of thermal decomposition occurring due to the particles being heated to a high temperature is reduced.

In addition to the precursor acid and neutralising agent feedstocks, pre-neutralised surfactants eg. PAS, LAS and LES may be fed into the drying zone as a separate feedstock and/or as an admixture with the neutralising agent and/or the precursor acid.

The process of the invention may be carried out in any suitable apparatus however it is preferred that a flash reactor is employed. Suitable flash reactors include e.g. the Flash Drier system available from VRV SpA Impianti Industriali. The drying zone may have a heat transfer area of at least 10 $m^2$. The cooling zone desirably has a heat transfer area of at least 5 $m^2$.

Optionally two or more drying zones may be employed before the cooling zone as desired. A single apparatus may be employed to provide the drying zone and cooling zone as desired or alternatively separate apparatus for example a drier and a cooling fluid bed may be employed.

Suitably the drying zone is substantially circular in cross section and is thus defined by a cylindrical wall. Preferably the said wall is heated by means of a heating jacket through which water, steam or oil may be fed. The inside of the said wall is preferably maintained at a temperature of at least 130° C. and especially at least 140° C. Preferably the drying zone has an evaporation rate of 3 to 25, and especially 5 to 20 kg water per $m^2$ of heat surface per hour.

The cooling zone is preferably defined by a cylindrical wall. Where the process is continuous, the apparatus is suitably arranged such that the drying zone and cooling zone are substantially horizontally aligned to facilitate efficient drying, cooling and transport of the material through the drying and cooling zones in a generally horizontal direction.

Suitably the drying zone and preferably the cooling zone have agitation means therein which agitates and transports the surfactant paste and forming granules through the said zones. The agitation means preferably comprises a series of radially extending paddles and/or blades mounted on an axially mounted rotatable shaft. Desirably the paddles and/or blades are inclined in order to effect transportation and preferably have a clearance from the inner wall of no more than 10 mm, for example 5 mm.

We have found that the present invention has especial applicability in the production of detergent particles comprising PAS. PAS is presently available on the market in fine powder form or in noodle form. The fine powder is generally dusty, having a significant quantity of particles of less than 150 microns. PAS noodles are generally produced by extruding dried PAS which has the appearance of soap chips and typically have a very large particle size and a very low porosity leading to poor dissolution characteristics. To increase the level of detergent active material in a detergent composition it is known to post-dose detergent particles to provide a composition having a high level of active material.

However, PAS in fine powder form and PAS noodles are generally not suitable for post-dosing into a detergent composition as the composition particles and the post-dosed particles are generally of different particle size and thus tend to segregate and be unsightly. The process according to the present invention enables detergent particles having a high level of detergent active material and suitable porosity and particle size characteristics to be obtained.

Accordingly a third aspect of the invention provides detergent particles comprising at least 60% by weight of the particle of an anionic surfactant, preferably PAS, and not more than 15% by weight of the particle of water, the particles being obtainable by a process according to the first or second aspect of the invention.

According to a fourth aspect of the invention there is provided detergent particles comprising an anionic surfactant, preferably PAS in an amount of at least 60% by weight of the particle, wherein the particles have a porosity of 5 to 50% volume of the particle and a particle size distribution such that at least 80% of the particles have a particle size of 180 to 1500 microns, preferably 250 to 1200 microns and less than 10% and preferably less than 5% of the particles have a particle size less than 180 $\mu$m.

We have found that the dissolution characteristics of particles comprising PAS may be improved by reducing the Krafft temperature of the PAS active to below 13° C., the Krafft temperature for PAS which is conventionally employed in detergent products.

Accordingly, a further aspect of the invention provides detergent particles comprising PAS, preferably at a level of at least 60%, more preferably at least 70% and especially at least 85% by weight of the particle, wherein the PAS has a Krafft temperature below 13° C. and the average particle size is from 180 to 1500 $\mu$m.

Preferably the particles are produced by a process according to the invention as herein described.

Suitably at lease 50% and especially at least 70% of the PAS has a linear alkyl chain.

Preferably the Krafft temperature is below 10° C. and more preferably below 5° C. as the solubility of the PAS is significantly superior at temperatures above the Krafft temperature.

The Krafft temperature of the PAS may be reduced by any suitable means.

It has been surprisingly found that by employing a narrow alkyl chain length distribution, the Krafft temperature thereof may be reduced. Preferably at least 90% and preferably at least 95% of the PAS active has a chain length of $C_{12}$ to $C_{16}$ and especially, for example EMPICOL LXV100 (tradename) ex Albright and Wilson.

The Krafft temperature may also be reduced by employing a branched detergent active, preferably an alkyl benzene sulphonate, alcohol sulphate, Guerbet alcohol sulphate, secondary alcohol sulphate, secondary alkyl sulphonates, secondary and preferably premixing together with a linear alcohol sulphate. Branched chain surfactants may assist in foam generation which is desirable for the consumer in some markets.

Examples of suitable branched surfactants include PETRELAB 550, LIAL 123 AS (ex DAC).

The Krafft temperature of the PAS may be reduced by employing a quaternary ammonium counterion for up to 50 mole %, preferably up to 30 mole % and especially up to 20 mole % of the detergent active in particles. Preferably the quaternary ammonium counterion is selected from ammonium and quaternised mono, di or tri alkanol amine, for example ethanol amines.

Examples of suitable materials include the TEXAPON (tradename) range of surfactants ex Henkel.

The Krafft temperature may be lowered by employing, a narrow chain length distribution, a branched chain surfactant or a quaternary ammonium counterion, preferably a combination of these factors is employed to achieve further improvement in the solubility of the detergent particles.

Suitably the anionic surfactant in the detergent particles according to the third and fourth aspects of the invention is present in an amount of at least 65% preferably at least 85% and desirably at least 90% by weight of the particles. The particles may also comprise water in an amount of 1 to 20%, preferably 1 to 15% and more preferably 1 to 10% by weight of the particles. The water in the particle provides improved granule integrity thus reducing the level of the fine particles.

Suitably at least 80%, preferably 90% and more preferably 95% of the particles have a mean particle size of 300 to 1000 microns and more preferably 400 to 900 microns.

Desirably the detergent particles have an aspect ratio not in excess of 2 and more preferably are generally spherical in order to reduce segregation from other particles in a formulated detergent composition and to enhance the visual appearance of the powder.

Suitably the PAS surfactant has a chain length of $C_{10}$ to $C_{22}$ preferably $C_{12}$ to $C_{18}$ and more preferably a narrow range of $C_{12}$ to $C_{14}$, Coco PAS is particularly desirable.

The detergent particle may comprise mixtures of PAS with other surfactants and/or non surfactant components as desired.

Suitable other surfactants may comprise alkyl benzene sulphonates, oxo alcohol sulphates for example $C_{11}$ to $C_{15}$ and $C_{13}$ to $C_{15}$ alcohol sulphates, secondary alcohol sulphates and sulphonates, unsaturated surfactants for example sodium oleate, oleyl sulphates, $\alpha$-olefin sulphonate, or mixtures thereof.

Especially preferred are PAS rich particles, that is particles in which the amount of PAS exceeds the amount of any other surfactant or non-surfactant and more preferably exceeds the total amount of all other surfactant and non-surfactant components.

Generally the sodium salt of the surfactants will be employed however, mono, di or tri alkanolamine and/or ammonium counterions which provide a structure—weakening effect may be used as desired to improve low temperature solubility of the particles.

Other non-surfactant components which may be present in the detergent particles include dispersion aids, preferably polymeric dispersion aids and more preferably urea, sugars, polyalkyleneoxides; and builders as hereinafter described.

If desired the detergent particles may comprise an organic and/or inorganic salt. Suitable materials in salts, preferably sodium, of tripolyphosphate, citrates, carbonates, sulphates, chlorides.

It is especially preferred that a salt be present in the particle when the anionic surfactant comprises LAS.

The salt may be present at a level of up to 40% and preferably up to 30% by weight of the particles.

The detergent particles may be post-dosed directly to a base powder obtained from any conventional detergent production process including a non tower process in which the components of the detergent composition are mixed and a spray drying process optionally followed by a post tower densification. As the detergent particles produced by the present invention may be post-dosed to such powders a significant degree of formulation flexibility is obtained and the level of active material in the fully formulated composition may be very high as desired. A further advantage is that a base powder which is substantially free of detergent active compounds may be produced as the detergent active compounds may be introduced substantially wholly as post-dosed particles.

Accordingly a fifth aspect of the invention provides a detergent composition comprising detergent particles according the third or fourth aspects of the invention and a base powder.

The option of reducing the level of detergent active material in a base powder is especially advantageous where the base powder is produced by a spray drying process as a lower level of detergent active compound in the spray drying process permits a higher throughput to be secured thus increasing overall production efficiency.

Compositions according to the fifth aspect of the invention generally contain, in addition to the detergent-active compound, a detergency builder and optionally bleaching components and other active ingredients to enhance performance and properties.

Detergent compositions of the invention may contain, in addition to the post-dosed detergent particles, one or more detergent-active compounds (surfactants) which may be chosen from soap and non-soap anionic, cationic, nonionic, amphoteric and zwitterionic detergent-active compounds, and mixtures thereof. Many suitable detergent-active compounds are available and are fully described in the literature, for example, in "Surface-Active Agents and Detergents", Volumes I and II, by Schwartz, Perry and Berch. The preferred detergent-active compounds that can be used are soaps and synthetic non-soap anionic and nonionic compounds.

Anionic surfactants are well-known to those skilled in the art. Examples include alkylbenzene sulphonates, particularly linear alkylbenzene sulphonates having an alkyl chain length of C8–C15; primary and secondary alkyl sulphates, particularly C12–C15 primary alkyl sulphates; alkyl ether sulphates; olefin sulphonates; alkyl xylene sulphonates; dialkyl sulphosuccinates; and fatty acid ester sulphonates. Sodium salts are generally preferred.

Nonionic surfactants that may be used include the primary and secondary alcohol ethoxylates, especially the $C_8$–$C_{20}$ aliphatic alcohols ethoxylated with an average of from 1 to 20 moles of ethylene oxide per mole of alcohol, and more especially the $C_{10}$–$C_{15}$ primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (glucamide).

The total amount of surfactant present in the detergent composition is suitably from 5 to 40 wt % although amounts outside this range may be employed as desired.

The detergent compositions of the invention generally also contain a detergency builder. The total amount of detergency builder in the compositions is suitably from 10 to 80 wt %, preferably from 15 to 60 wt %. The builder may be present in an adjunct with other components or, if desired, separate builder particles containing one or more builder materials may be employed.

Inorganic builders that may be present include sodium carbonate, if desired in combination with a crystallisation. seed for calcium carbonate, as disclosed in GB 1 437 950 (Unilever); crystalline and amorphous aluminosilicates, for example, zeolites as disclosed in GB 1 473 201 (Henkel), amorphous aluminosilicates as disclosed in GB 1 473 202 (Henkel) and mixed crystalline/amorphous aluminosilicates as disclosed in GB 1 470 250 (Procter & Gamble); and layered silicates as disclosed in EP 164 514B (Hoechst). Inorganic phosphate builders, for example, sodium orthophosphate, pyrophosphate and tripolyphosphate, may also be present, but on environmental grounds those are no longer preferred.

Zeolite builders may suitably be present in an amount of from 10 to 60 wt % and preferably an amount of from 15 to 50 wt %. The zeolite used in most commercial particulate detergent compositions is zeolite A. Advantageously, however, maximum aluminium zeolite P (zeolite MAP) described and claimed in EP 384 070A (Unilever) may be used. Zeolite MAP is an alkali metal aluminosilicate of the P type having a silicon to aluminium ratio not exceeding 1.33, preferably not exceeding 1.15, and more preferably not exceeding 1.07.

Organic builders that may be present include polycarboxylate polymers such as polyacrylates, acrylic/maleic copolymers, and acrylic phosphinates; monomeric polycarboxylates such as citrates, gluconates, oxydisuccinates, glycerol mono-, di- and trisuccinates, carboxymethyloxysuccinates, carboxymethyloxymalonates, dipicolinates, hydroxyethyliminodiacetates, alkyl- and alkenylmalonates and succinates; and sulphonated fatty acid salts. A copolymer of maleic acid, acrylic acid and vinyl acetate is especially preferred as it is biodegradable and thus environmentally desirable. This list is not intended to be exhaustive.

Especially preferred organic builders are citrates, suitably used in amounts of from 5 to 30 wt %, preferably from 10 to 25 wt %; and acrylic polymers, more especially acrylic/maleic copolymers, suitably used in amounts of from 0.5 to 15 wt %, preferably from 1 to 10 wt %. The builder is preferably present in alkali metal salt, especially sodium salt, form.

Suitably the builder system comprises a crystalline layered silicate, for example, SKS-6 ex Hoechst, a zeolite, for example, zeolite A and optionally an alkali metal citrate.

Detergent compositions according to the invention may also contain a bleach system, desirably a peroxy bleach compound, for example, an inorganic persalt or organic peroxyacid, capable of yielding hydrogen peroxide in aqueous solution. The peroxy bleach compound may be used in conjunction with a bleach activator (bleach precursor) to improve bleaching action at low wash temperatures. An especially preferred bleach system comprises a peroxy bleach compound (preferably sodium percarbonate optionally together with a bleach activator), and a transition metal bleach catalyst as described and claimed in EP 458 397A, EP 458 398A and EP 509 787A (Unilever).

The compositions of the invention may contain alkali metal, preferably sodium, carbonate, in order to increase detergency and ease processing. Sodium carbonate may suitably be present in an amount from 1 to 60 wt %, preferably from 2 to 40 wt %. However, compositions containing little or no sodium carbonate are also within the scope of the invention.

Powder flow may be improved by the incorporation of a small amount of a powder structurant, for example, a fatty acid (or fatty acid soap), a sugar, an acrylate or acrylate/maleate polymer, or sodium silicate which is suitably present in an amount of from 1 to 5 wt %.

Other materials that may be present in detergent compositions of the invention include sodium silicate; antiredeposition agents such as cellulosic polymers; fluorescers; inorganic salts such as sodium sulphate; lather control agents or lather boosters as appropriate; proteolytic and lipolytic enzymes; dyes; coloured speckles; perfumes; foam controllers; and fabric softening compounds. This list is not intended to be exhaustive.

The base composition is suitably prepared by spraying drying a slurry of compatible heat-insensitive ingredients, and then spraying on, admixing and/or postdosing those ingredients unsuitable for processing via. the slurry. The detergent particles produced according to the process of the present invention are post-dosed to the base composition by conventional methods.

Detergent compositions of the invention preferably have a bulk density of at least 500 g/l, more preferably at least 550 g/liter, more preferably at least 700 g/liter.

Such powders may be prepared either by spray-drying, by post-tower densification of spray-dried powder, or by wholly non-tower methods such as dry mixing and granulation. A high-speed mixer/granulator may advantageously be used for such mixing. Processes using high-speed mixer/granulators are disclosed, for example, in EP 340 013A, EP 367 339A, EP 390 251A and EP 420 317A (Unilever).

The invention is illustrated by the following non-limiting Examples.

EXAMPLE 1

Streams of a liquid coco PAS acid and a 30% solution of caustic soda were fed into the drying zone of a Flash Drier ex VRV SpA. Italy at a temperature of about 60° C. and feed rates of 8 $kghr^{-1}$ and 7.5 $kghr^{-1}$ respectively. The temperature of the wall of the drying zone was about 155° C. and the heat transfer surface of the drying and cooling zones was about 0.5 $m^s$ and about 0.25 $m^2$ respectively.

The agitator in the drying and cooling zones was operated at a top speed of about 37 $ms^{-1}$ and a vacuum of about 100 to 150 mm $H_2O$ was applied.

The cooling zone was operated at a temperature of about 40° C.

PAS granules comprising 71 to 74% coco PAS, and 13 to 15% moisture were obtained. The relatively high level of moisture was due to a large excess of caustic soda solution being employed. A smaller excess of caustic soda produces granules having a higher PAS content and lower moisture and caustic contents.

In comparison with a similar process in which pre-neutralised PAS was fed to the Flash Drier instead of the acid and neutralising agent feedstocks, a throughout increase of 25% (based on the quantity of particles produced) was achieved.

EXAMPLE 2

An example of a detergent composition according to the invention is listed below in which the base powder, PAS granules and other components are dry-mixed:

| | | |
|---|---|---|
| Base Powder | | 60% |
| Nonionic surfactant | 12 | |
| Soap | 2 | |
| Zeolite builder | 38 | |
| Moisture, salts, NDOM | 8 | |
| PAS granules | | 9% |
| Percobonate | | 20% |
| Minors | | 11% |
| (inclued foam supressor, TAED, enzyme) | | |

The compositions exhibited good detergency and dissolution characteristics.

EXAMPLE 3 TO 9

Examples of detergent particles according to the present invention and which may be produced by a process according to the present invention are listed in the following Table. The time for 90% of the particles to dissolve in water at 5° C. was measured using an AGB-4001 conductivity meter with a final surfactant concentration of 0.2 $gl^{-1}$ in demineralised water.

| | 5 | 6 | 7 | 8 | 9 | 10 | 11 |
|---|---|---|---|---|---|---|---|
| Coco PAS $C_{13-14}$ sodium salt | 100 | 50 | 80 | 70 | 80 | 90 | 76 |
| [a]TEA salt | — | — | — | 10 | 20 | 10 | — |
| [b]LIAL 123 AS | — | 50 | 20 | 20 | — | — | 19 |
| [c]PEG 4000 | — | — | — | — | — | — | 5 |
| Dissolution time (mins) | 20 | 1 | 3 | 1 | 0.5 | 1 | 3 |

[a]triethanolamine
[b]branched PAS sodium salt ex DAC
[c]ex BDH

We claim:

1. A process for the production of detergent particles consisting essentially of at least 50%, by weight of an anionic surfactant and no more than 20% by weight of water which comprises contacting a pumpable precursor acid of an anionic surfactant with a pumpable aqueous neutralising agent in a drying zone to produce an anionic surfactant the total water content being in excess of 20% by weight, heating the surfactant in the said drying zone to reduce the water content to not more than 20% by weight, to a temperature from 130° to 170° C. and subsequently cooling the surfactant to form detergent particles.

2. A process for the production of detergent particles consisting essentially of at least 50% by weight of an anionic surfactant and no more than 20% by weight of water which comprises contacting a pumpable precursor acid of an anionic surfactant with a pumpable neutralising agent in a drying zone to produce an anionic surfactant, to total water content being in excess of 20% by weight, agitating the precursor and neutralising agent with agitation means which have a tip speed in excess of 15 $ms^{-1}$ heating the surfactant to a temperature from 130° to 170° C. in the said drying zone to reduce the water content to not more than 20% by weight and subsequently cooling the surfactant to form detergent particles.

[3. Detergent particles comprising at least 60% by weight of the particle of an anionic surfactant and not more than 15% by weight of the particle of water, the particles being obtainable by a process according to the process according to claim 1.]

[4. Detergent particles according to claim 3 comprising an anionic surfactant, wherein the particles have a porosity of 5 to 50% volume of the particles and a particles size distribution such that at least 80% of the particles have a particle size of 180 to 1500 microns, and less than 10% of the particles have a particles size less than 180 $\mu$m.]

[5. A detergent composition comprising detergent particles as defined in claim 3 and a base powder comprising at least one of a surfactant and a builder.]

[6. A detergent composition according to claims 5 in which the base powder comprises a builder comprising a silicate.]

[7. A detergent composition according to claim 5 which further comprises an alkali metal percarbonate.]

*8. A process for the production of detergent particles consisting essentially of at least 50% by weight of an anionic surfactant and no more than 20% by weight of water which comprises:*

*contacting a pumpable precursor acid of an anionic surfactant with a pumpable aqueous neutralising agent solution or slurry, wherein the neutralising agent is present in an amount of 25–55% by weight of the aqueous solution or slurry, in a drying zone comprising a heating jacket to produce an anionic surfactant, the total water content being in excess of 10% by weight,*

*heating the surfactant in the said drying zone to reduce the water content to not more than 20% by weight, to a temperature from 130° to 170° C.;*

*and subsequently cooling the surfactant to form detergent particles.*

*9. A process for the production of detergent particles consisting essentially of at least 50% by weight of an anionic surfactant and nor more than 20% by weight of water which comprises:*

*contacting a pumpable precursor acid of an anionic surfactant with a pumpable aqueous neutralising agent solution or slurry, wherein the neutralising agent is present in an amount of 25–55% by weight of the solution or slurry, in a drying zone comprising a heating jacket to produce an anionic surfactant, the total water content being in excess of 10% by weight, agitating the precursor and neutralising agent with agitation means which have a tip speed in excess of 15 $ms^{-1}$;*

*heating the surfactant to a temperature from 130° to 170° C. in the said drying zone to reduce water content to not more than 20% by weight;*

*and subsequently cooling the surfactant to form detergent particles.*

* * * * *